(12) United States Patent
Tutor

(10) Patent No.: US 9,554,613 B2
(45) Date of Patent: Jan. 31, 2017

(54) METHOD OF MANUFACTURING A MULTI-COLORED SAFETY HELMET

(71) Applicant: Radians, Inc., Memphis, TN (US)

(72) Inventor: Mike S. Tutor, Memphis, TN (US)

(73) Assignee: Radians, Inc., Memphis, TN (US)

( * ) Notice: Subject to any disclaimer, the term of this patent is extended or adjusted under 35 U.S.C. 154(b) by 146 days.

(21) Appl. No.: 14/272,992

(22) Filed: May 8, 2014

(65) Prior Publication Data

US 2015/0320133 A1    Nov. 12, 2015

(51) Int. Cl.
*B29C 45/14* (2006.01)
*A42C 2/00* (2006.01)
*A42B 3/04* (2006.01)

(52) U.S. Cl.
CPC ............. *A42C 2/002* (2013.01); *A42B 3/0433* (2013.01); *B29C 45/14336* (2013.01)

(58) Field of Classification Search
None
See application file for complete search history.

(56) References Cited

U.S. PATENT DOCUMENTS

| | | | | |
|---|---|---|---|---|
| 2,610,322 A | * | 9/1952 | Daly | A42B 3/06 2/412 |
| 2,844,823 A | * | 7/1958 | Havens | A42C 1/02 2/175.9 |
| 3,904,469 A | * | 9/1975 | Dickstein | A45C 1/12 156/245 |
| 5,003,635 A | * | 4/1991 | Peterson | A01N 25/34 2/170 |
| 5,885,600 A | * | 3/1999 | Blum | A01N 65/00 424/405 |
| 5,996,125 A | * | 12/1999 | Garzone | A42B 3/227 2/10 |
| 6,170,090 B1 | | 1/2001 | Minor | |
| 8,615,817 B2 | | 12/2013 | Phillips | |
| 8,893,313 B2 | * | 11/2014 | Lowther | A42B 1/24 2/422 |
| D748,866 S | * | 2/2016 | Tutor | D29/102 |
| D749,269 S | * | 2/2016 | Tutor | D29/102 |
| 2004/0256770 A1 | | 12/2004 | Padgett et al. | |
| 2009/0183290 A1 | * | 7/2009 | Palarino | A42B 1/00 2/4 |
| 2013/0180035 A1 | * | 7/2013 | Lowther | A42B 1/24 2/422 |

FOREIGN PATENT DOCUMENTS

| | | | |
|---|---|---|---|
| CA | 02300754 | * | 5/2000 |
| CN | 101138445 | * | 3/2008 |

* cited by examiner

*Primary Examiner* — Edmund Lee
(74) *Attorney, Agent, or Firm* — Brinks Gilson & Lione

(57) ABSTRACT

Provided is a safety helmet that exhibits more than one color. Methods of manufacturing such safety helmets are also provided.

7 Claims, 4 Drawing Sheets

METHOD OF MANUFACTURING A MULTI-COLORED SAFETY HELMET

BACKGROUND OF THE INVENTION

Safety remains a paramount concern for members of the work force where injury to the head may occur. Such work force members include general construction workers, road construction workers, assembly line workers, electricians, plumbers, and general labor workers. These workers are typically required to not only wear clothing items that meet certain safety requirements, but are also required to wear protective gear on the head in the form of a safety helmet. Typically, a safety helmet (e.g., hard hat) is worn to protect the head of a worker from falls or from impacts by sharp or blunt objects. At least 20 million Americans alone wear safety helmets on the job while over 120,000 job-related head injuries occur each year. Many workers must regularly work in dimly lit or dark areas where visibility of the worker is needed and where the worker wishes to stand out from the environment. Thus, there remains a need for safety helmets that protect the worker in a variety of working conditions.

SUMMARY OF THE INVENTION

According to one aspect, a safety helmet is provided that include a shell having a brim wherein a portion of the brim or shell is a different color from the remainder of the helmet. According to one embodiment, the brim includes an underside and top side, wherein the underside or top side or both the underside and top side are at least partially covered with a band. According to such an embodiment, the band is a different color from the shell and the band is not removable from the brim. According to one embodiment, the band comprises a thermoplastic elastomer. According to one embodiment, the thermoplastic elastomer is selected from the group consisting of styrenic block copolymers, polyolefin blends, elastomeric alloys, thermoplastic polyurethanes, thermoplastic copolyester, and thermoplastic polyamides. According to one embodiment, the shell comprises high density polyethylene. According to one embodiment, the band exhibits a high visibility color. According to an alternative embodiment, the brim is formed entirely from a thermoplastic elastomer (no underlying shell material).

According to another aspect, a method of manufacturing a multi-colored safety helmet is provided. The method includes the steps of forming a safety helmet comprising a shell having a brim and molding a band to the brim such that the brim is at least partially covered with the band. According to such an embodiment, the band is a different color from the shell, and the band is not removable from the brim. According to one embodiment, the band is comprised of a thermoplastic elastomer. According to one embodiment, the band is molded to the band by a compression molding, transfer molding or injection molding. According to one embodiment, the injection molding is carried out via overmolding a thermoplastic elastomer onto the brim. According to another embodiment, the overmolding is carried out by insert molding. According to yet another embodiment, the overmolding is multi-shot injection molding. According to one embodiment, the thermoplastic elastomer forms a bond with the brim such that no primer or adhesive is required.

According to yet another aspect, a method of manufacturing a multi-colored safety helmet is provided that includes forming a safety helmet that includes a shell having a brim via an injection molding process, wherein a portion of the brim or shell is a different color from the remainder of the helmet. According to one embodiment, the brim is formed entirely from a thermoplastic elastomer. According to one embodiment, the injection molding process is a multi-shot injection molding process. According to one embodiment, the safety helmet is formed entirely from high density polyethylene. According to one embodiment, the brim is a different color from the remainder of the shell.

DETAILED DESCRIPTION OF THE INVENTION

Provided is a safety helmet that exhibits more that one color. According to one embodiment, a portion of the safety helmet is overmolded wherein the overmolded portions of the helmet are a different color from the remainder of the helmet. According to one such embodiment, the safety helmet includes a band molded to the shell's brim wherein the band exhibits a color that is different from the helmet shell. The band is manufactured from a thermoplastic elastomer resulting in a safety helmet that provides multiple advantages over traditional, single color safety helmets. The band, for example, provides improved grip for the user in cold or dry conditions, prevents chipping of the brim, reduces vibration, increases overall comfort level, provides a water resistant seal, absorbs sound, limits glare, and provides electrical insulation. According to another embodiment, the safety helmet is manufactured in a manner that produces a safety helmet made from a single material yet exhibits more than one color. According to yet another embodiment, the safety helmet is manufactured in a manner that produces a safety helmet that includes a different colored brim that is also made from an entirely different material from that of the helmet's shell. According to any of the aforementioned embodiments, exhibiting a different color provides a higher level of visibility for the wearer within the work environment.

Figure 1:
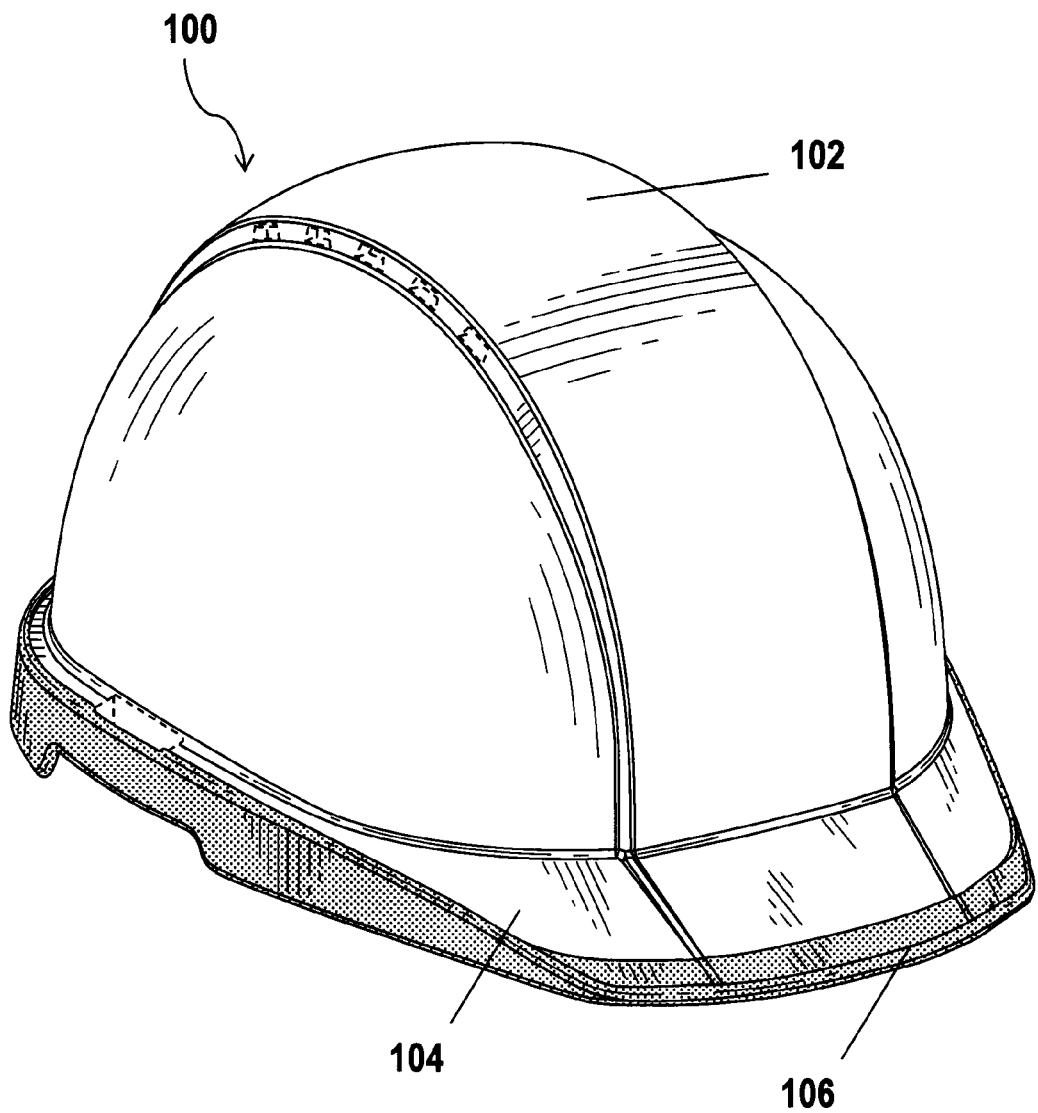
FIG. 1 is a rear perspective view of a safety helmet according to one embodiment.
Figure 2:
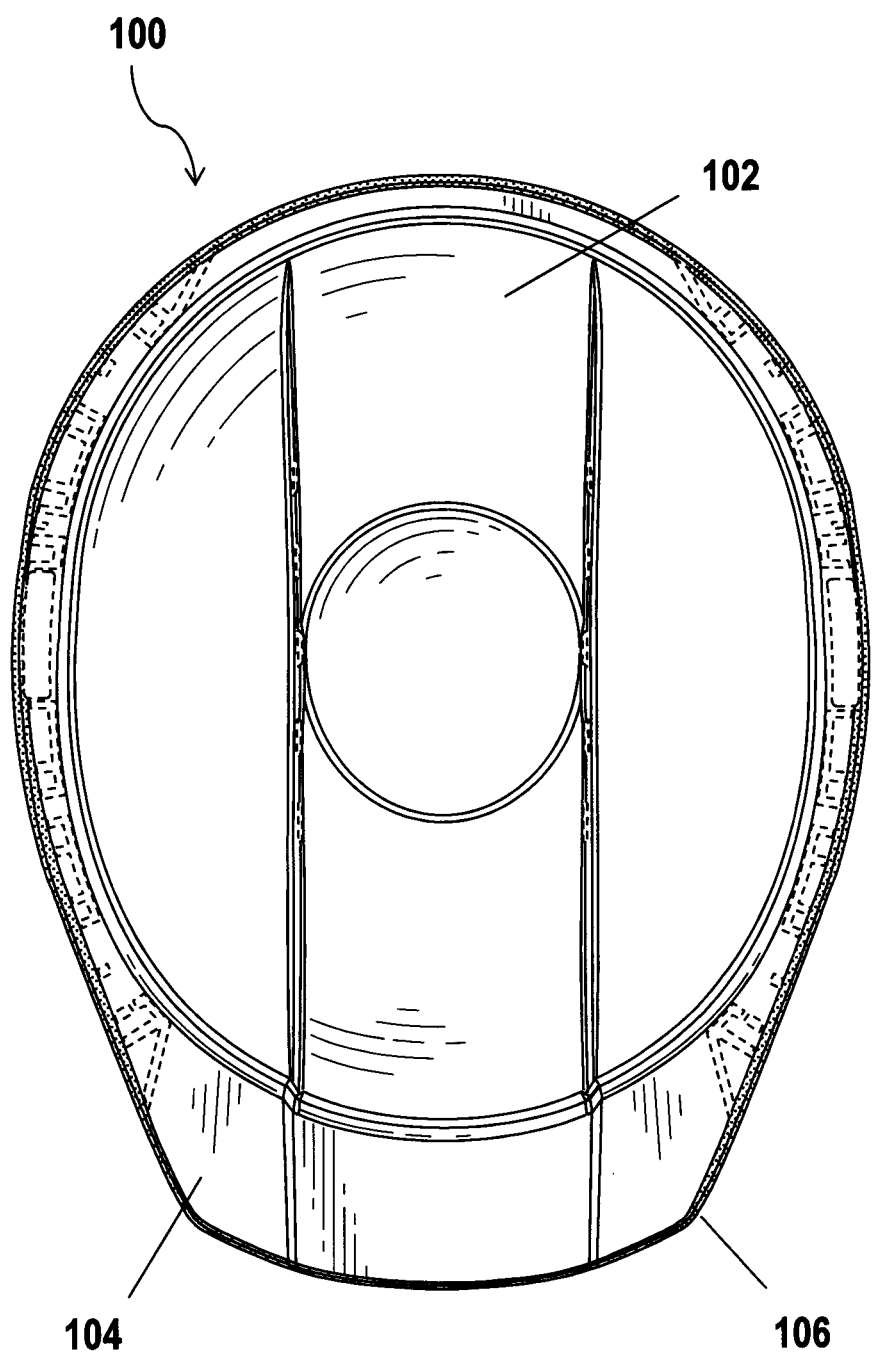
FIG. 2 is a bottom view of the safety helmet according to the embodiment of FIG. 1.
Figure 3:
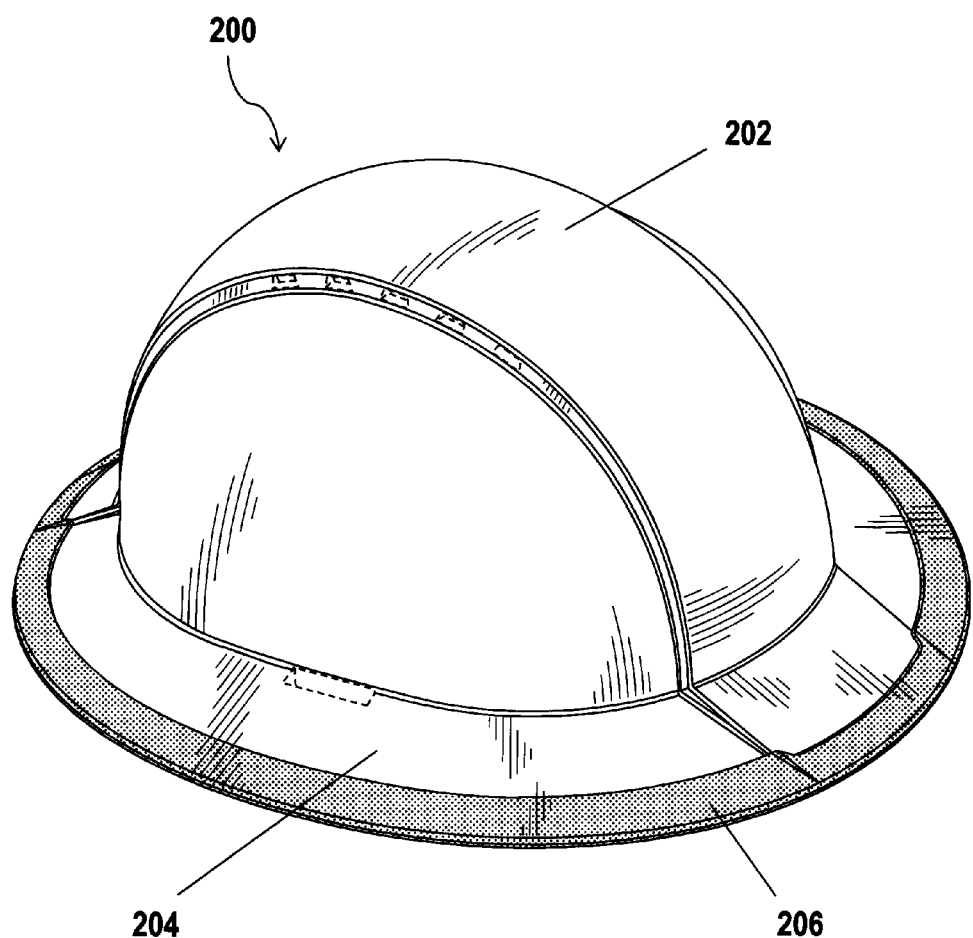
FIG. 3 is a rear perspective view of a safety helmet according to an alternative embodiment.
Figure 4:
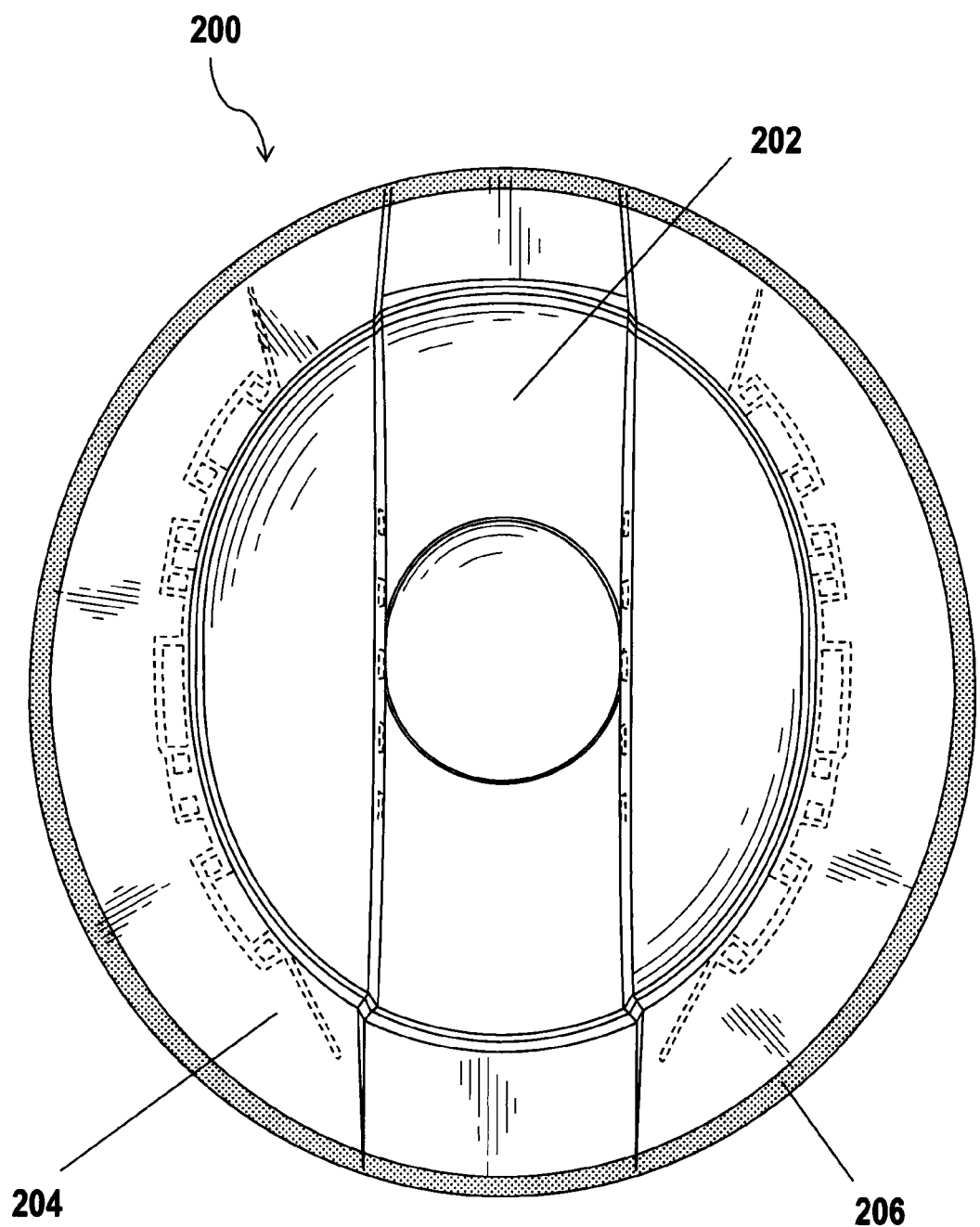
FIG. 4 is a bottom view of the safety helmet according to the embodiment of FIG. 3.

As illustrated in FIGS. 1-4, the safety helmet may be a traditional cap-style 100 (FIGS. 1-2) or full brim 200 (FIGS. 3-4). According to either embodiment, the helmets (100, 200) include a shell (102, 202) that has a brim (104, 204) that is at least partially covered with a band (106, 206). The band (106, 206) is a different color from the shell (102, 202).

The shell of the safety helmet as provided herein may be manufactured according to any acceptable manufacturing process that results in an ANSI-approved shell (e.g., both ANSI Type I and ANSI Type II). According to an alternative embodiment, the shell's brim is manufactured from an entirely different material as provided herein from that of the remainder of the helmet's shell. Accord to such an embodiment, the brim may be manufactured entirely from a suitable material such as, for example, a thermoplastic elastomer. According to such an embodiment, the entire thermoplastic elastomer brim may be attached to the helmet's shell via an acceptable procedure that bonds the thermoplastic elastomer to a shell material (e.g., high density polyethylene). According to one embodiment, the thermoplastic brim is attached to the shell via a heat or thermal bonding process. Depending on the intended use, the hard hat shell may be made of a thermoplastic such as polyethylene or polycarbonate resin, or of other materials like fiberglass, resin-impregnated textiles, or aluminum. According to a preferred embodiment, the shell is manufactured from high density polyethylene.

The band as described herein may be applied to the brim portion of the safety helmet shell in such a manner that the band covers at least a portion of the brim surface. According to one embodiment, the band covers a substantial portion of the brim surface extending from the top outer surface to the underside of the brim (see e.g., FIGS. 1-4). According to an alternative embodiment, the band substantially covers only the top outer surface of the brim. According to yet another embodiment, the band substantially covers only the underside of the brim so as to prevent glare on the wearer's face. The band is manufactured from a material that can be molded directly to the brim such that the band permanently adheres to the surface of the shell's brim and is not removable upon application. According to one embodiment, the band is manufactured from a thermoplastic elastomer. Suitable thermoplastic elastomers include, but are not limited to, styrenic block copolymers, polyolefin blends, elastomeric alloys, thermoplastic polyurethanes, thermoplastic copolyester, and thermoplastic polyamides. According to a preferred embodiment, the band is manufactured from a styrenic block copolymer such as, for example, styrene butylene styrene (SBS) or styrene ethylene butylene stryrene (SEBS).

The band color may be chosen from a variety of colors and may depend on the color of the corresponding shell. Various workers may wear different colored shells depending on the worker's rank or position on the job. Thus, according to one embodiment, the brim color may be chosen so that the color compliments the shell color. According to a preferred embodiment, the brim exhibits a high visibility color to aid in the identification of the wearer (e.g., construction worker, electrician, or plumber). As used herein, the term "high visibility color" refers to a color that aids in the identification of a person or object under low lit or dimly lit conditions. Suitable high visibility colors as contemplated herein include, but are not limited to, yellow, green, orange, red and fluorescent versions thereof. Retroreflective material may be added to either the band or shell to reflect light back to the source when light hits the material. According to a preferred embodiment, the safety helmet as provided herein meets or exceed the ANSI standards for high visibility safety headwear (e.g., ANSI/SEA 107-2010).

The thickness of the band directly impacts the feel of the band to the wearer and may be adjusted accordingly during the molding processes as described herein. According to one embodiment, the band thickness is less than or equal to the thickness of the brim to which the band is secured. According to one embodiment, the band is from about 0.040 to about 0.060 inches in thickness such that the band does not delaminate and does not rise far above the surface of the brim. According to one embodiment, radii are used to avoid sharp corners or transitions from the band to the brim and reduce stresses. According to one embodiment, the band surface includes a plurality of ribs such that the band has a varying thickness across the brim. According to one embodiment, the coefficient of friction of the thermoplastic elastomer forming the band is adjusted such that the band may feel tacky, smooth, or silky, depending on the end wearer's preference.

The safety helmet as described herein may be manufactured by a variety of industry acceptable methods. For example, the shell as described herein may be manufactured by an injection molding process. In such a process, the shell mold is selected and a form is positioned within the injection molding press. Electric lines are connected to the mold, as are lines carrying chilled water that will cool the mold. The shell material such as, for example, high density polyethylene is supplied in the form of pellets from a supply hopper by a vacuum system. Optionally, pellets having a specified colorant are drawn from another supply hopper and mixed with the shell material pellets. According to a one embodiment, color pellets of a high visibility color are added such that the helmet shell exhibits a high visibility color. A vacuum system can then transfer the pellet mixture into the injection molding press. Within the press, the pellets are heated to melt and the molten material is injected into the mold to form the hard hat shell.

According to an alternative embodiment, the shell may be manufactured to include more than one color. According to such an embodiment, the shell is manufactured according to a two-shot (e.g., multiple shot) molding process.

The band may be formed by compression molding, transfer molding or injection molding the band directly onto the existing shell's brim. Thus, according to one embodiment, the band is molded over the brim. According to an alternative embodiment, the brim is adjusted during manufacturing to accommodate the thickness and size of the band such that the band transition from the band to the brim surface is substantially seamless. According to a preferred embodiment, the band is formed by injection molding. According to a particularly preferred embodiment, the band is formed by overmolding which is understood by those skilled in the art to refer to the injection molding process where one material (e.g., thermoplastic elastomer) is molded onto a second material (e.g., high density polyethylene of the shell's brim). By overmolding the band directly onto the brim surface, the band material will form a strong bond with the underlying brim resulting in permanent application of the band to the brim (i.e., band not removable after molding). Such a process eliminates the need for any primer or adhesives to assure bonding.

According to one embodiment, overmolding includes insert molding the band onto the brim. According to such a process, the shell is placed into a mold and the band material (e.g., thermoplastic elastomer) is shot directly over the brim. According to an alternative embodiment, overmolding includes a two-shot (e.g., multiple shot) molding process to form the band. According to such a process, a special injection machine required is equipped with two or more barrels allowing two or more materials to be shot into the same mold during the same molding cycle. According to either embodiment, mold and melt temperature are closely monitored to avoid shrinkage of the thermoplastic elastomer. According to one embodiment, the mold temperature is maintained at or above 10° C. depending on the type of injection molding apparatus. According to one embodiment, the mold temperature is in the range of from about 10° C. to about 100° C.

According to an alternative embodiment, any portion of the safety helmet shell may be overmolded with a thermoplastic elastomer in a manner as provided herein. According to one such embodiment, at least a portion of the shell's dome (excluding the brim) is overmolded such that the brim and a portion of the shell's dome exhibit two different colors.

Pelletized color concentrate may be introduced during the overmolding process such that the resulting overmolded portion of the helmet exhibits a specific color. The color concentrate is preferably introduced with a carrier that does not adversely affect the adhesion of the band to the brim. Suitable carriers include polypropylene, polyethylene, and vinyl acetate. According to one embodiment, color concentrate pellets are mixed with the thermoplastic elastomer in a "salt and pepper" mix. According to such an embodiment, dye pellets are mixed into a batch of thermoplastic elastomer. As the pellets are heated and compressed for injection into the mold, the thermoplastic elastomer and dye pellets melt and mix together before being injected into the mold. According to a preferred embodiment, the thermoplastic elastomers are pre-compounded to reduce variable loading levels and color drifts throughout a production run. According to one embodiment, pre-compounding includes mixing colorant with the thermoplastic elastomer, melting and extruding the elastomer, re-pelletizing the resulting mix, and then repeating the process until a thorough mix is achieved.

According to one embodiment, the injection mold for the shell is adapted such that the resulting shell band is molded over the brim while the shell is within the same press and mold that formed the shell. According to another embodiment, the press opens the mold and the shell is ejected. The ejected shell is then transferred to another machine where the band is molded to the brim by any of the methods provided herein.

While some embodiments have been shown and described, various modifications and substitutions may be made thereto without departing from the spirit and scope of the invention. For example, for claim construction purposes, it is not intended that the claims set forth hereinafter be construed in any way narrower than the literal language thereof, and it is thus not intended that exemplary embodiments from the specification be read into the claims. Accordingly, it is to be understood that the present invention has been described by way of illustration and not limitations on the scope of the claims.

I claim:

1. A method of manufacturing a multi-colored safety helmet comprising
    forming a safety helmet comprising a shell having a brim encompassing an entire perimeter of the shell;
    injection molding a band to an entire perimeter of the brim such that the brim is at least partially covered with the band; and
    adjusting thickness of the band and brim such that the band does not rise above an outer surface of the brim,
    wherein the band is a different color from the shell,
    wherein the band is not removable from the brim,
    wherein the band is comprised of a thermoplastic elastomer that forms a bond with the brim such that no primer or adhesive is required.

2. The method of claim 1, wherein the injection molding is carried out via overmolding a thermoplastic elastomer onto the brim.

3. The method of claim 2, wherein the overmolding is carried out by insert molding.

4. The method of claim 1, wherein the injection molding is carried out via multi-shot injection molding.

5. The method of claim 1, wherein the color is a high visibility color.

6. The method of claim 1, wherein the safety helmet meets or exceeds ANSI/SEA 107-2010.

7. The method of claim 1, further comprising the step of adjusting the coefficient of friction of the thermoplastic elastomer to exhibit a specific surface characteristic.

* * * * *